J. B. SCHUMAN.
STALK CROP HANDLING MACHINE.
APPLICATION FILED NOV. 8, 1905.
987,406.
Patented Mar. 21, 1911.
5 SHEETS—SHEET 1.
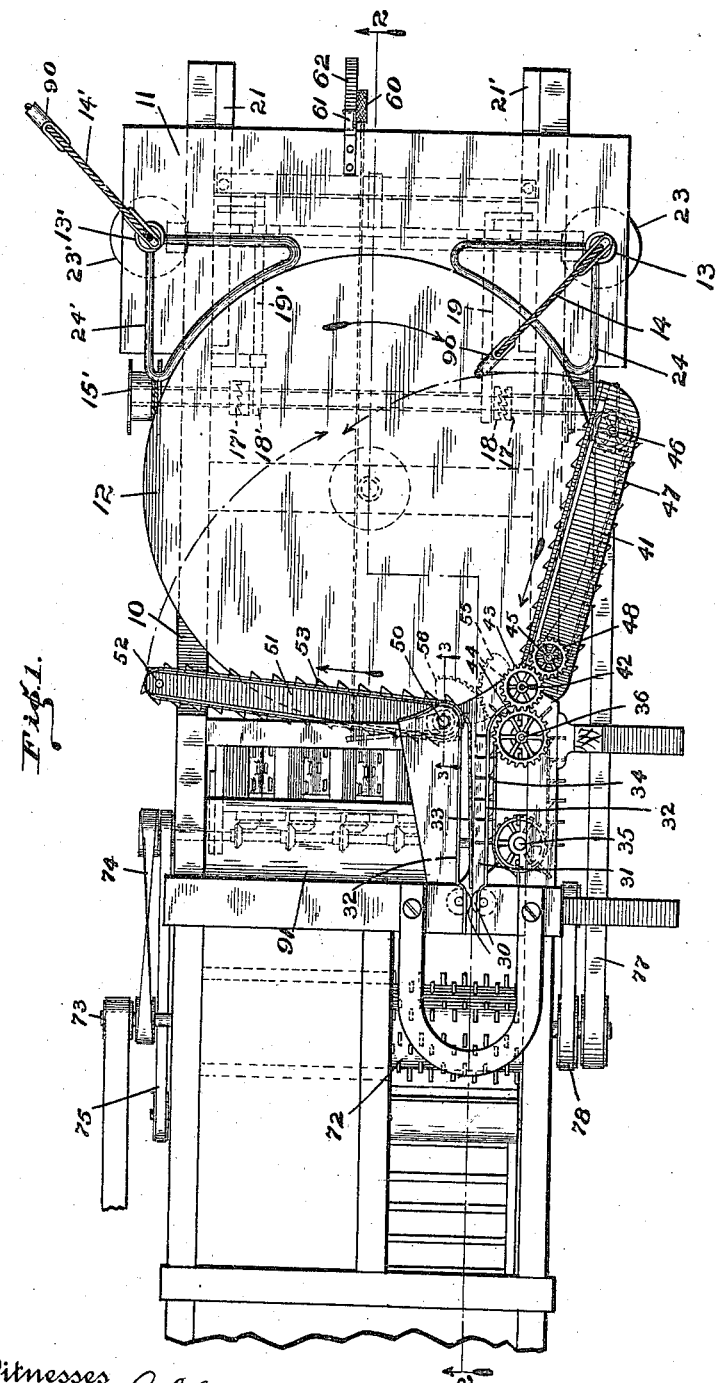
Witnesses
Frank A. Fahle
J. A. Walsh
Inventor
James B. Schuman
BY
Bradford & Hood
Attorneys

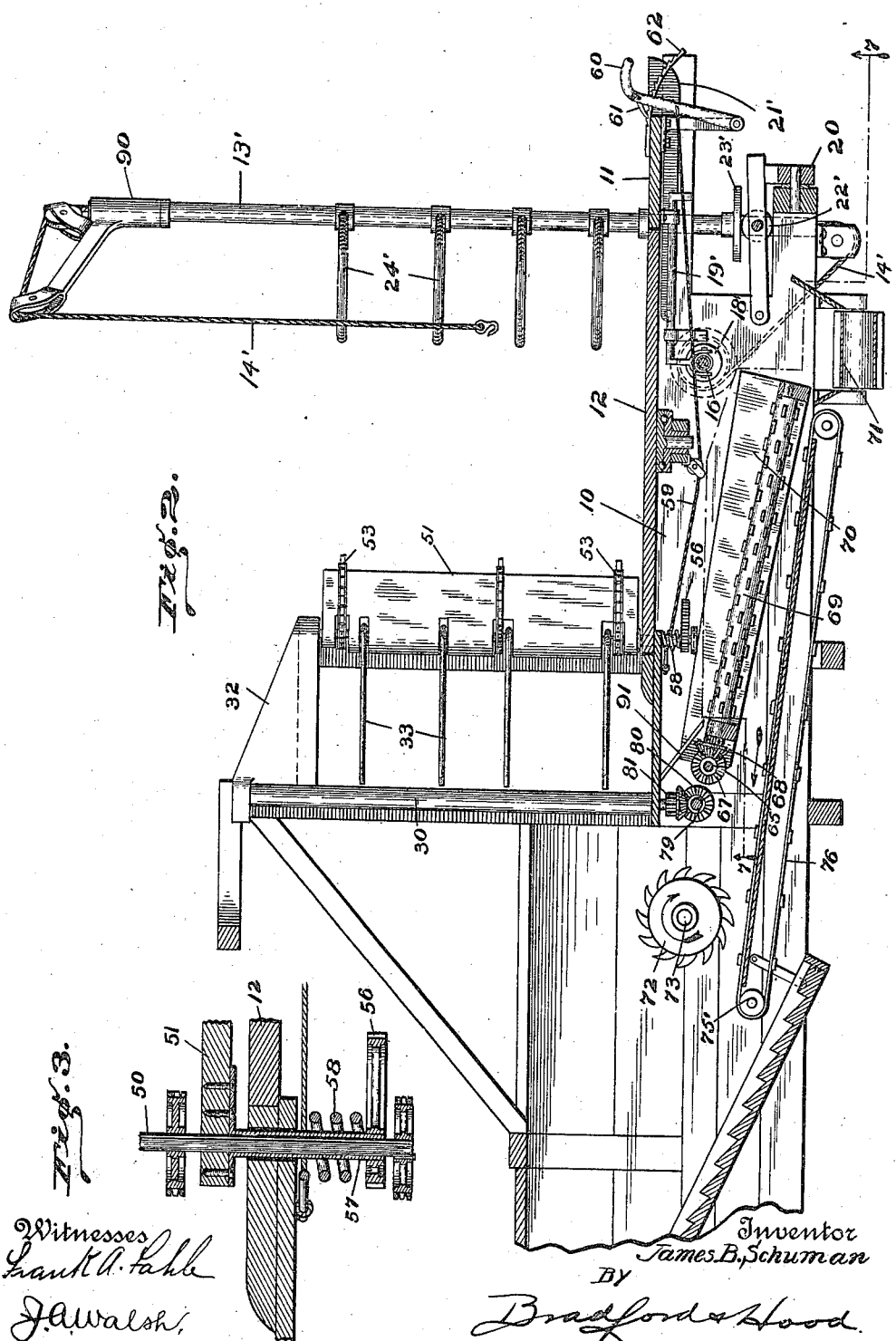

J. B. SCHUMAN.
STALK CROP HANDLING MACHINE.
APPLICATION FILED NOV. 8, 1905.
987,406.
Patented Mar. 21, 1911.
5 SHEETS—SHEET 3.
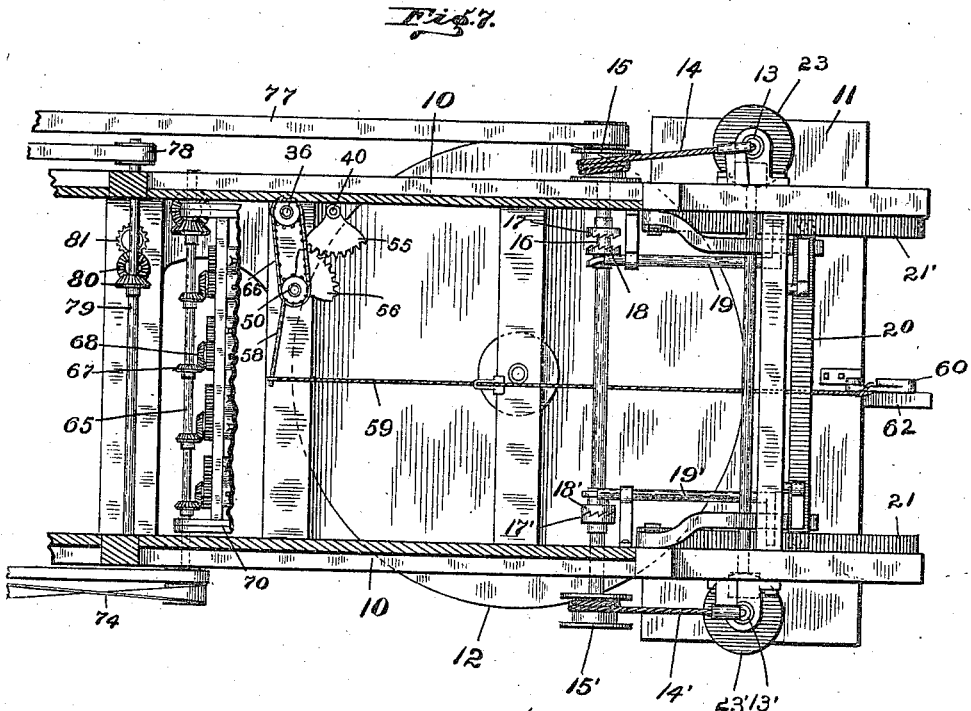
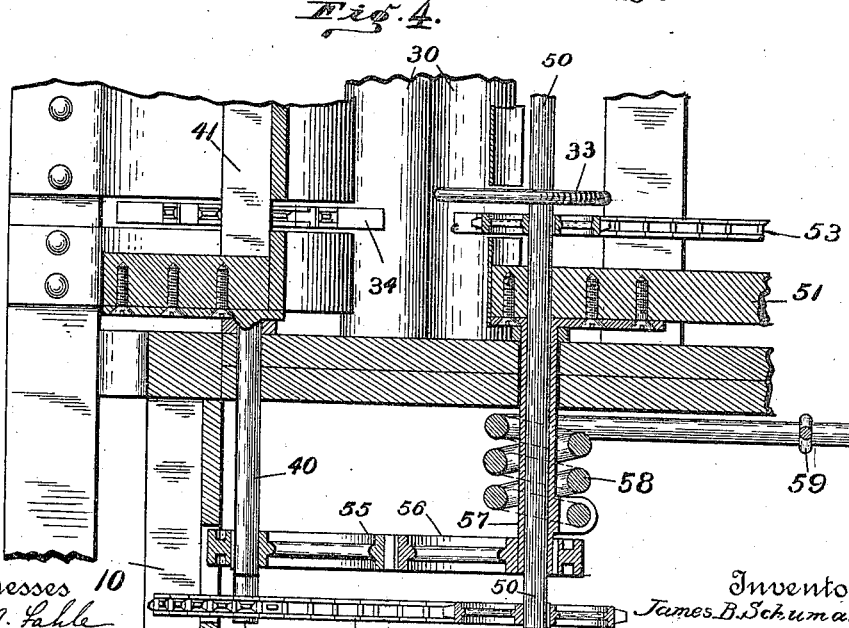
Witnesses
Frank A. Fahle
J. A. Walsh
Inventor
James B. Schuman
By
Bradford & Hood
Attorneys J. B. SCHUMAN.
STALK CROP HANDLING MACHINE.
APPLICATION FILED NOV. 8, 1905.
987,406.
Patented Mar. 21, 1911.
5 SHEETS—SHEET 4.
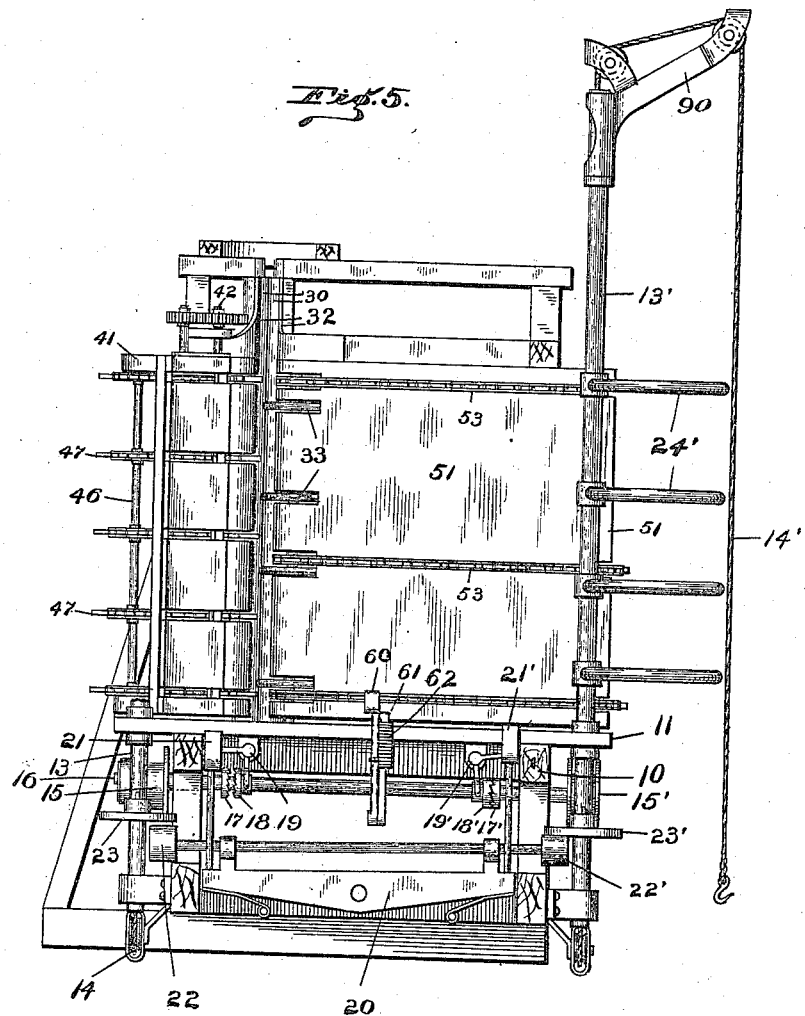

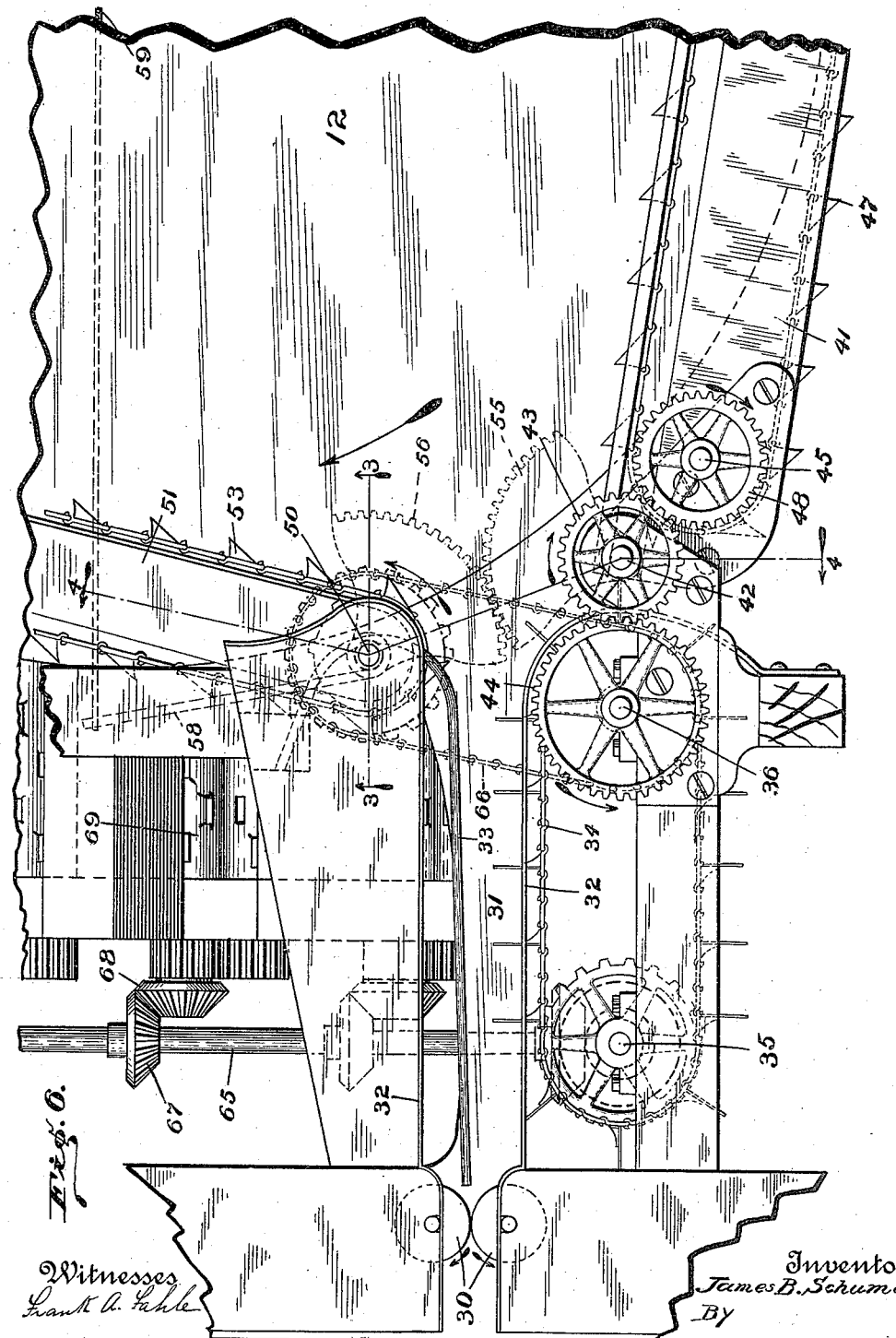

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

STALK-CROP-HANDLING MACHINE.

987,406.   Specification of Letters Patent.   Patented Mar. 21, 1911.

Application filed November 8, 1905. Serial No. 286,440.

*To all whom it may concern:*

Be it known that I, JAMES B. SCHUMAN, a citizen of the United States, residing at Indianapolis, in the county of Marion and State of Indiana, have invented certain new and useful Improvements in Stalk-Crop-Handling Machines, of which the following is a specification.

The object of my invention is to produce a mechanism capable of receiving a complete shock of corn or similar crop and subjecting continuously successive portions of the shock to means by which the ears of corn or other crop are removed from the stalk and the husks removed therefrom, and by means of which the stalks and husks shall be suitably shredded.

The accompanying drawings illustrate my invention.

Figure 1 is a plan of an embodiment of my invention; Fig. 2 a section on line 2 2 of Fig. 1; Fig. 3 a detail on a larger scale on line 3 3 of Figs. 1 and 6; Fig. 4 a detail on line 4 4 of Fig. 6; Fig. 5 an end elevation from the shock-receiving end, one of the lifting shredders being omitted for the sake of clearness; Fig. 6 a plan on an enlarged scale of the feeding mechanism immediately adjacent the snapping rollers; Fig. 7 a section on line 7—7 of Fig. 2 looking in the direction indicated by the arrows.

In the drawings, 10 indicates a suitable frame at one end of which is arranged a suitable platform 11 for the operators. Immediately forward of platform 11 is a horizontal rotatable shock-receiving table 12, upon which an entire shock may be stood so that the shock may be rotated about its vertical axis. Complete shocks of corn may be lifted to the table and deposited thereon by means of either one of the derricks 13 and 13' which are mounted upon vertical axes on the platform 11. The derricks carry lifting cables 14 14' respectively by means of which a shock may be lassoed and lifted. The cable 14 passes down through the derrick mast 13 and from thence to a winding drum 15 carried by a shaft 16, and the cable 14' passes similarly to a winding drum 15' also carried by the shaft 16, each of the drums being sleeved upon the shaft and carrying clutch members 17 and 17' respectively adapted to be engaged by clutch members 18 and 18' respectively splined upon the shaft 16, and movable into and out of engagement with their coöperating clutch members by means of rock-shafts 19 and 19' respectively journaled in brackets on the underside of platform 11, said rock-shafts being connected by means of a rocking lever 20 and foot levers 21 and 21' as clearly shown in Fig. 5. Carried by the rocking lever 20 are a pair of brake members 22 and 22' which are each adapted to engage the flange 23 or 23' respectively carried by the respective masts 13 and 13'.

The masts 13 and 13' each carry members 24 and 24' respectively which at their outer ends are shaped to substantially conform to the curvature of the table 12, so that when the derricks are in the position shown in Fig. 1, said members 24 and 24' will form segmental walls of considerable height at separated points adjacent the table 12, thus serving, when the shock is large, as a guide to prevent the stalks from slipping from the table.

The table 12 may be positively rotated if desired without departing from my invention, but in the present drawings I show means for rotating the table indirectly by engagement of the shock itself in the following manner: Located a short distance in rear of table 12, and preferably to one side of the central line thereof, is a pair of snapping rollers 30 which are arranged substantially vertical, and leading to the crotch between the snapping rollers is a passageway 31 formed between guides 32 32, which guides extend from the edge of the table to the snapping rollers, the passageway 31 of course having a bottom which should be preferably level with or below the upper surface of the table 12. Arranged along one side of the passageway 31 are spring fingers 33 which extend forward nearly to the snapping rollers and tend to urge the stalks toward the opposite side of the passageway, in order that they may be engaged and fed forward by feed chains 34 carried by suitable shafts 35 and 36. Journaled in the main frame closely adjacent the shaft 36 and the edge of table 12 is a stud 40 which is attached to the lower forward corner of a swinging feed frame 41 carrying near its inner end a shaft 42. Shaft 42 carries a gear 43 at its upper end, which gear meshes with a gear 44 carried by the shaft 36.

Journaled in the frame 41 are two vertical shafts 45 and 46 which carry a plurality of sprocket wheels over which run feed belts 47 having portions which project from the otherwise smooth vertical inner face of the frame 41 in order to engage the outer layer of stalks of a shock placed upon table 12. The feed chains 47 are driven by means of a gear 48 carried by shaft 45 and mesh with the gear 43. Mounted upon the opposite side of the throat of the passage 31 and closely adjacent the table 12 is a vertical shaft 50 upon which is journaled the forward end of a driving frame 51, said frame carrying at its outer end a vertical shaft 52. The two shafts 50 and 52 carry suitable sprocket wheels over which are arranged belts 53 which carry fingers which project through the inner smooth vertical face of the driving frame 51, in order to engage the outer layer of stalks of a shock on table 12. In order that the two frames 41 and 51 may swing simultaneously toward the center of the table 12 I attach to the lower end of stud 40 a toothed segment 55 which meshes with a similar toothed segment 56 which is attached to a sleeve 57 surrounding shaft 50 and attached to the lower forward corner of frame 51. In order that the two frames 41 and 51 may be yieldingly urged toward the center of the table 12 when a shock is in position thereon, but may remain in the position shown in Fig. 1, during the placing of a shock on the table, I attach to the sleeve 57 one end of a coiled spring 58 which surrounds the lower end of shaft 50. The free end of spring 58 is made of considerable length, as clearly shown in Figs. 6 and 7, and a cable 59 attached thereto, said cable passing to the rear beneath the table 12 and being attached to a foot lever 60 arranged at the rear of platform 11 and provided with a pawl 61 adapted to engage a segment 62, the arrangement being such that the operator may readily place the spring 59 under tension, so as to urge the two frames 41 and 51 toward each other, or may relieve that tension so that the frames will stay in any desired position. The shaft 35 is driven by a shaft 65, and the shaft 50 is driven by means of a belt 66 connecting it with shaft 36, the speed of the shaft 50 being somewhat less than the speed of the shaft 42 for a purpose which will appear. Shaft 65 carries gears 67 which mesh with gears 68 carried by the husking rollers 69, which husking rolls are of any desired form and carried in a frame 70 extending downward and rearward beneath the table 12 and discharging to an endless carrier 71 which is adapted to deliver the husked corn from the side of the machine.

Mounted to the rear of the snapping rolls is a shredder cylinder 72, the shaft 73 of which is the main drive shaft of the machine, and drives shaft 65 by means of belt 74. A belt 75 also extends from shaft 65 to a shaft 75' which carries a raddle 76 arranged beneath the shredder drum and the husking rolls. The shaft 16 is driven by means of a belt 77 extending from shaft 73 to shaft 16, and the snapping rolls are driven by means of a belt 78 from the shredder cylinder shaft to a shaft 79 which is geared to the snapping rolls by gears 80 and 81.

Each of the derricks 13 and 13' is provided at its upper end with a bracket 90 which is independently swiveled upon the upper end of the derrick mast.

The operation is as follows: The tension on spring 58 is released and the two frames 41 and 51 swung to the positions shown in Fig. 1. Thereupon one of the derricks 13 or 13' may be swung upon its axis so as to allow the guides 24 or 24' thereof to hang out beyond the platform 11, as shown in Fig. 5, and the lifting cable is attached to a shock, whereupon the operator by stepping upon the proper foot lever 21 or 21' will cause the corresponding winding drum 15 or 15' to lift the shock so that its butt will be above the upper face of table 12, the shock being supported in the curved crotch of the guide 24 or 24'. The derrick mast may then be swung around so as to deliver the shock upon the table 12. Thereupon the band of the shock is cut so as to free the stalks, and tension is put upon the spring 58 so that the two frames 41 and 51 will swing toward each other and engage the shock. The various parts are then put in motion and the two belts 47 and 53 engage the shock by a tangential force serving to turn the table slowly in the direction indicated by the arrow in Fig. 1. The belt 47, however, moves much more rapidly than the belt 53 so that the speed of rotation of the shock will be that of the speed of the belt 53, while the belt 47 serves to strip off the outer stalks of the shock and deliver them to the carrier 34, whereupon said carrier drives the stalks to the snapping rollers 30, the stalks remaining upright or substantially so until after they have passed the snapping rollers, and the ears of corn drop upon an apron 91 and slide from thence to the husking rollers. The apron 91 is omitted from Fig. 6 for the sake of clearness. The stalks drop from the snapping rollers upon the shredding cylinder and are discharged from thence to the rear by any suitable mechanism not shown.

By the means described it will be possible to handle a complete shock from any suitable shock-handling wagon and deliver the same bodily to the present machine where it will be automatically fed to the shredding mechanism, the two frames 41 and 51 approaching each other as the shock is decreased in size until the last remnant of stalks is delivered to the snapping rollers.

I claim as my invention:

1. In a stalk crop handling machine, the combination of a rotatable shock-receiving table of such form as to receive a shock of stalks and support the same substantially vertically, means for engaging a shock placed on said table and stripping successive stalks from the outer portion thereof and for delivering said stalks.

2. In a stalk crop handling machine, the combination of a rotatable shock-receiving table of such form as to receive a shock of stalks and support the same substantially vertically, means for engaging a shock placed on said table and stripping successive stalks from the outer portion thereof, means for delivering said stalks, and a driving means for rotating the table.

3. In a stalk crop handling machine, the combination of a rotatable shock-receiving table of such form as to receive a shock of stalks and support the same substantially vertically, means for engaging a shock placed on said table and stripping successive stalks from the outer portion thereof, and means for rotating the table.

4. In a stalk crop handling machine, the combination of a rotatable shock-receiving table of such form as to receive a shock of stalks and support the same substantially vertically, guides forming a passageway leading from the table, a carrier arranged to drive stalks through said passageway, a frame arranged to travel over the table, and an endless carrier carried by the frame and adapted to engage the outer layer of stalks of a shock arranged on said table and deliver the same to the passageway carrier.

5. In a stalk crop handling machine, the combination of a rotatable shock receiving table, guides forming a passageway leading from the table, a carrier arranged to drive stalks through said passageway, a frame arranged to travel over the table, an endless carrier carried by said frame and adapted to engage the outer layer of stalks of a shock arranged on said table and deliver the same to the passageway carrier, a second frame arranged to travel over the table in opposition to the first frame, and an endless driver carried by said frame in position to engage a shock placed on the table and thereby rotate the shock and table.

6. In a stalk crop handling machine, the combination of a rotatable shock-receiving table, guides forming a passageway leading from the table, a carrier arranged to drive stalks through said passageway, a frame arranged to travel over the table, an endless carrier carried by said frame and adapted to engage the outer layer of stalks of a shock arranged on said table and deliver the same to the passageway carrier, a second frame arranged to travel over the table in opposition to the first frame, an endless driver carried by said frame in position to engage a shock placed on the table and thereby rotate the shock and table, and means for driving said frames simultaneously toward the center of the table.

7. In a stalk crop handling machine, the combination of a rotatable shock receiving table, a pair of frames each pivotally supported at one end adjacent the table so that their free ends may swing toward each other toward the center of the table, and stalk engaging means carried by said frames.

8. In a stalk crop handling machine, the combination of a rotatable shock-receiving table, a pair of frames each pivotally supported at one end adjacent the table so that their free ends may swing toward each other toward the center of the table, and an endless stalk engaging belt carried by each of said frames.

9. In a stalk crop handling machine, the combination of a rotatable shock receiving table, a pair of frames each pivotally supported at one end adjacent the table so that their free ends may swing toward each other toward the center of the table, stalk engaging means carried by said frames, and means for driving the free ends of said frames simultaneously toward each other.

10. In a stalk crop handling machine, the combination of a rotatable shock-receiving table, a pair of frames each pivotally supported at one end adjacent the table so that their free ends may swing toward each other toward the center of the table, an endless stalk engaging belt carried by each of said frames, and means for driving the free ends of said frames simultaneously toward each other.

11. In a stalk crop handling machine, the combination of a rotatable shock-receiving table, guides forming a passageway leading from the table, a carrier arranged to drive stalks through said passageway, a frame arranged to travel over the table, an endless carrier carried by said frame and adapted to engage the outer layer of stalks of a shock arranged on said table and deliver the same to the passageway carrier, a second frame arranged to travel over the table in opposition to the first frame, an endless driver carried by said frame in position to engage a shock placed on the table and thereby rotate the shock and table, means for driving said frames simultaneously toward the center of the table, and means for yieldingly driving the free ends of said frames simultaneously toward each other.

12. In a stalk crop handling machine, the combination of a rotatable shock-receiving table, a pair of frames each pivotally supported at one end adjacent the table so that their free ends may swing toward each other toward the center of the table, stalk engaging means carried by said frames, and means for yieldingly driving the free ends of said frames simultaneously toward each other.

13. In a stalk crop handling machine, the combination of a rotatable shock-receiving table, a pair of frames each pivotally supported at one end adjacent the table so that their free ends may swing toward each other toward the center of the table, an endless stalk engaging belt carried by each of said frames, and means for yieldingly driving the free ends of said frames simultaneously toward each other.

14. In a stalk crop handling machine, the combination of a rotatable shock-receiving table, guides forming a passageway leading from the table, a carrier arranged to drive stalks through said passageway, a frame arranged to travel over the table, an endless carrier carried by said frame and adapted to engage the outer layer of stalks of a shock arranged on said table and deliver the same to the passageway carrier, a second frame arranged to travel over the table in opposition to the first frame, an endless driver carried by said frame in position to engage a shock placed on the table and thereby rotate the shock and table, means for driving said frames simultaneously toward the center of the table, means for yieldingly driving the free ends of said frames simultaneously toward each other, and means for controlling the application of said yieldingly driving means to said frames.

15. In a stalk crop handling machine, the combination of a rotatable shock-receiving table, a pair of frames each pivotally supported at one end adjacent the table so that their free ends may swing toward each other toward the center of the table, stalk engaging means carried by said frames, means for yieldingly driving the free ends of said frames simultaneously toward each other, and means for controlling the application of said yieldingly driving means to said frames.

16. In a stalk crop handling machine, the combination of a rotatable shock-receiving table, a pair of frames each pivotally supported at one end adjacent the table so that their free ends may swing toward each other toward the center of the table, an endless stalk engaging belt carried by each of said frames, means for yieldingly driving the free ends of said frames simultaneously toward each other, and means for controlling the application of said yieldingly driving means to said frames.

In witness whereof I have hereunto set my hand and seal at Indianapolis, Indiana, this first day of November, A. D. one thousand nine hundred and five.

JAMES B. SCHUMAN. [L. S.]

Witnesses:
 ARTHUR M. HOOD,
 JAMES A. WALSH.